(12) United States Patent
Aleali

(10) Patent No.: US 7,234,943 B1
(45) Date of Patent: Jun. 26, 2007

(54) ANALYZING COGNITIVE INVOLVEMENT

(75) Inventor: Amin Aleali, Concord, CA (US)

(73) Assignee: Placeware, Inc., Mountain View, CA (US)

( * ) Notice: Subject to any disclaimer, the term of this patent is extended or adjusted under 35 U.S.C. 154(b) by 892 days.

(21) Appl. No.: 10/440,171

(22) Filed: May 19, 2003

(51) Int. Cl.
*G09B 19/00* (2006.01)

(52) U.S. Cl. ...................................... 434/236
(58) Field of Classification Search ................ 434/236, 434/350
See application file for complete search history.

(56) References Cited

U.S. PATENT DOCUMENTS

| | | | |
|---|---|---|---|
| 5,682,882 A | 11/1997 | Lieberman | |
| 5,726,701 A | 3/1998 | Needham | 348/2 |
| 5,944,530 A * | 8/1999 | Ho et al. | 434/236 |
| 6,615,020 B2 | 11/2001 | Richter et al. | |
| 6,397,036 B1 | 5/2002 | Thean et al. | 434/350 |
| 6,400,392 B1 | 6/2002 | Yamaguchi et al. | |
| 6,435,878 B1 * | 8/2002 | Reynolds et al. | 434/236 |
| 6,484,010 B1 * | 11/2002 | Sheehan | 434/362 |
| 6,565,359 B2 * | 5/2003 | Calhoun et al. | 434/236 |
| 6,632,174 B1 | 10/2003 | Breznitz | |
| 6,699,043 B2 | 3/2004 | Ho et al. | |
| 6,743,022 B1 | 6/2004 | Sarel | |
| 7,043,194 B2 * | 5/2006 | Hoyashita et al. | 434/353 |
| 2001/0053513 A1 | 12/2001 | Corn et al. | |

\* cited by examiner

*Primary Examiner*—Robert E. Pezzuto
*Assistant Examiner*—Cameron Saadat
(74) *Attorney, Agent, or Firm*—Perkins Coie LLP

(57) ABSTRACT

A system and method for analyzing the cognitive involvement of one or more audience members may include receiving a first indication of cognitive involvement of an audience member in a presentation and calculating a cognitive involvement score from the first indication.

24 Claims, 10 Drawing Sheets

ANALYZING COGNITIVE INVOLVEMENT

DESCRIPTION OF THE INVENTION

Field of the Invention

This invention relates to the process of monitoring audience participation during a presentation, and more particularly to the process of analyzing the cognitive involvement of members of the audience during a presentation.

Background of the Invention

"Cognitive involvement" refers to both the degree of focus on an event and overall activity of one's mental processes on tasks associated with that event. The focus on an event refers to the degree of concentration on a subject, for example, the degree to which a student is concentrating on his or her teacher's lesson. The overall activity of one's mental processes relating to an event refers to the amount of effort an individual puts forth on events or tasks related to the presentation. While it is impossible to accurately and dynamically calculate the mental processes of a human being, a close approximation may be derived from the overall physical activity of that person and the degree to which the physical activities relate to the presentation. For example, a student who is actively taking notes, or answering a teacher's question is more likely to be actively processing a teacher's lesson than one who is doodling, or sitting still.

It is important for anyone presenting information to another to be able to assess the cognitive involvement of his or her audience in order to determine the effectiveness of their presentation. From the presenter's perspective, the ability to determine the cognitive involvement of each audience member at any point in the presentation may be an invaluable means for critiquing or improving one's presentation skills, or as a means for dynamically changing a presentation in order to better serve the needs and interests of an audience.

In face-to-face, one-on-one interactions, a presenter may be able to identify when a listener is cognitively involved in the presentation by paying attention to visual clues. For example, seeing another person's eyes wander, or watching them doodle in a notebook suggests that the person is not focusing on the presentation. When the presentation is not face-to-face, or when the presenter is speaking to more than one individual, the presenter is not able to as easily determine whether each audience member is cognitively involved at any point in time.

Multiple methods have been developed and used in order to attempt to analyze the cognitive involvement of an audience member. Such methods typically rely on a user's response, such as user feedback, a user question, or other user activity intended to convey information to the presenter. For example, the analyzer system, as described at www.perceptionanalyzer.com, provides a remote device for users to respond to questions. Any system or method that requires an affirmative response of an audience member as a sole criteria is inherently flawed, because the audience member is aware that the presenter expects a response. This knowledge provides an incentive to the audience member to respond, therefore artificially inflating any determination of the involvement of the audience member.

Instead, it is desirable to determine the cognitive involvement of audience members using an objective formula, based on realistic criteria in order to arrive at a cognitive involvement score. Such a system preferably includes the ability to rely on criteria other than prompted or unprompted audience responses. In addition, it is desirable to provide a means for dynamically displaying the results of the determination to the presenter.

SUMMARY OF THE INVENTION

In accordance with the invention, a system and method for analyzing the cognitive involvement of one or more audience members may include receiving a first indication of cognitive involvement of an audience member in a presentation and calculating a cognitive involvement score from the first indication.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed. The accompanying drawings, which are incorporated in and constitute a part of this specification, serve to explain the principles of the invention.

DESCRIPTION OF THE EMBODIMENTS

Reference will now be made in detail to the embodiments of the invention, examples of which are illustrated in the accompanying drawings. Wherever possible, the same reference numbers will be used throughout the drawings to refer to the same or like parts.

A presentation is a demonstration, either audio, visual, or audio-visual, carried out by a presenter for the benefit of an audience. A presentation may be one-sided or it may be interactive. For example, a conference (such as at a board room table, or a conference telephone call) is a presentation. In a conference, any speaker may be considered a presenter, and the remainder of the participants are the audience to that speaker. The audience members may have the opportunity or ability to respond, such as by asking questions, answering questions, or otherwise interacting with the presenter. However, the ability to interact is not required for the demonstration to be a presentation. One of ordinary skill in the art will therefore recognize that, consistent with the present invention, a presentation may include any situation in which an individual is speaking, demonstrating or otherwise conveying information to one or more other people.

Figure 1:
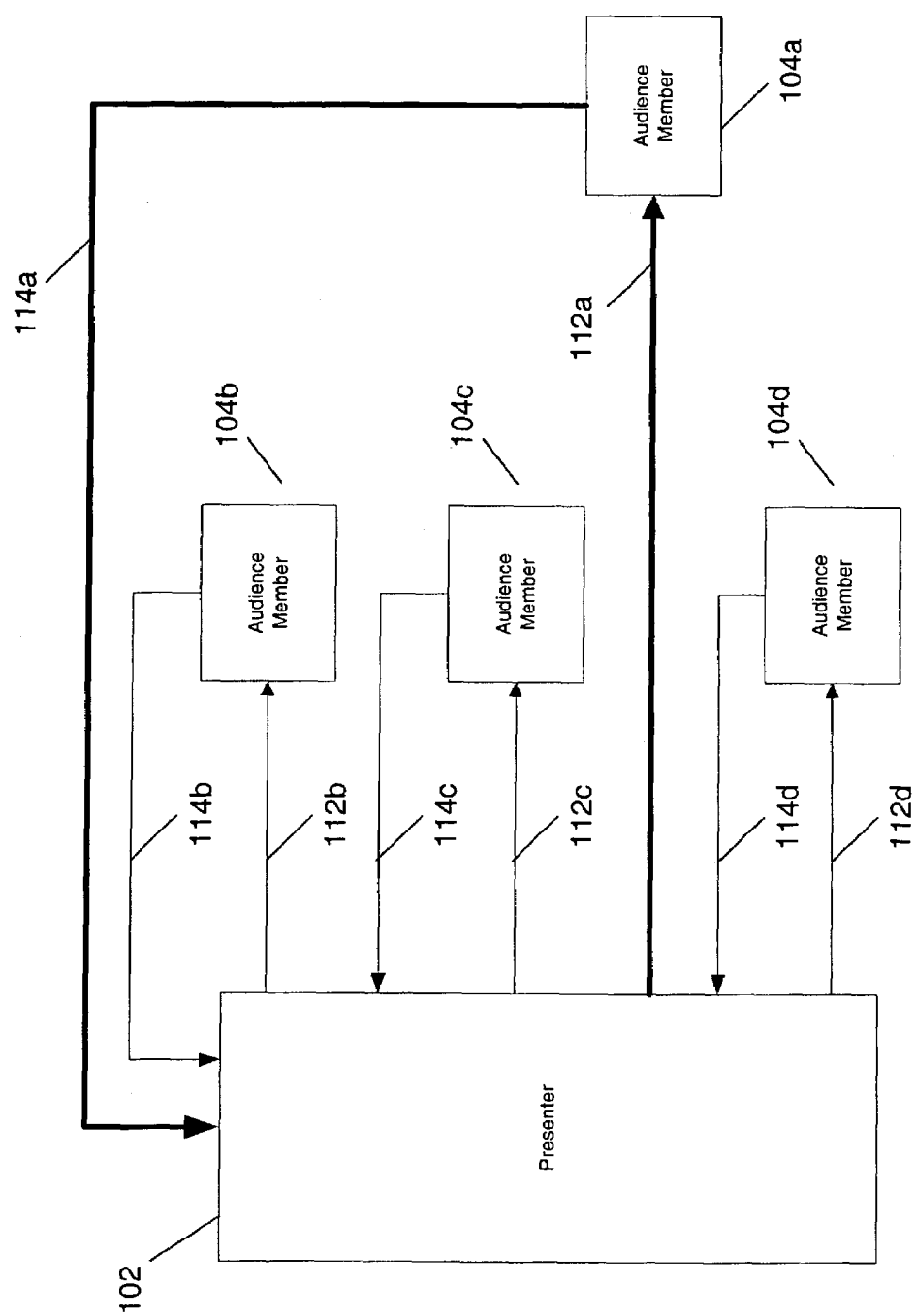
FIG. 1 is a block diagram showing a non computer implemented presentation.

FIG. 1 depicts a block diagram showing presentation 100. Presentation 100 consists of presenter 102, and one or more audience members 104a-d. FIG. 1 depicts four audience members, however one of ordinary skill in the art will recognize that any number of audience members may be present without departing from the scope of the present invention. Presentation 100 requires a communication channel 112a-d from presenter 102 to each audience member, in order for the presenter's demonstration to be perceived by the audience member. In addition, presentation 100 may also include a communication link 114 a-d by which audience member 104 may respond to presenter 102.

Communication channels 112a-d and 114a-d may utilize any one or more now known or later developed communication means. For example, if presentation 100 is presented live, then presenter 102 and audience member 104 may communicate orally along links 112a-d and 114a-d. If however, the presentation is being conducted such that presenter 102 and an audience member 104 are physically located at different locations, other communications channels may be utilized. In the latter case, communication links 112 or 114 may comprise closed circuit television, telephone, video or audio conferencing, voice-over Internet, etc. One of ordinary skill in the art will also recognize that communication links 112 and 114 may be implemented as two-way communication links from audience member 104 to presenter 102.

Figure 2:
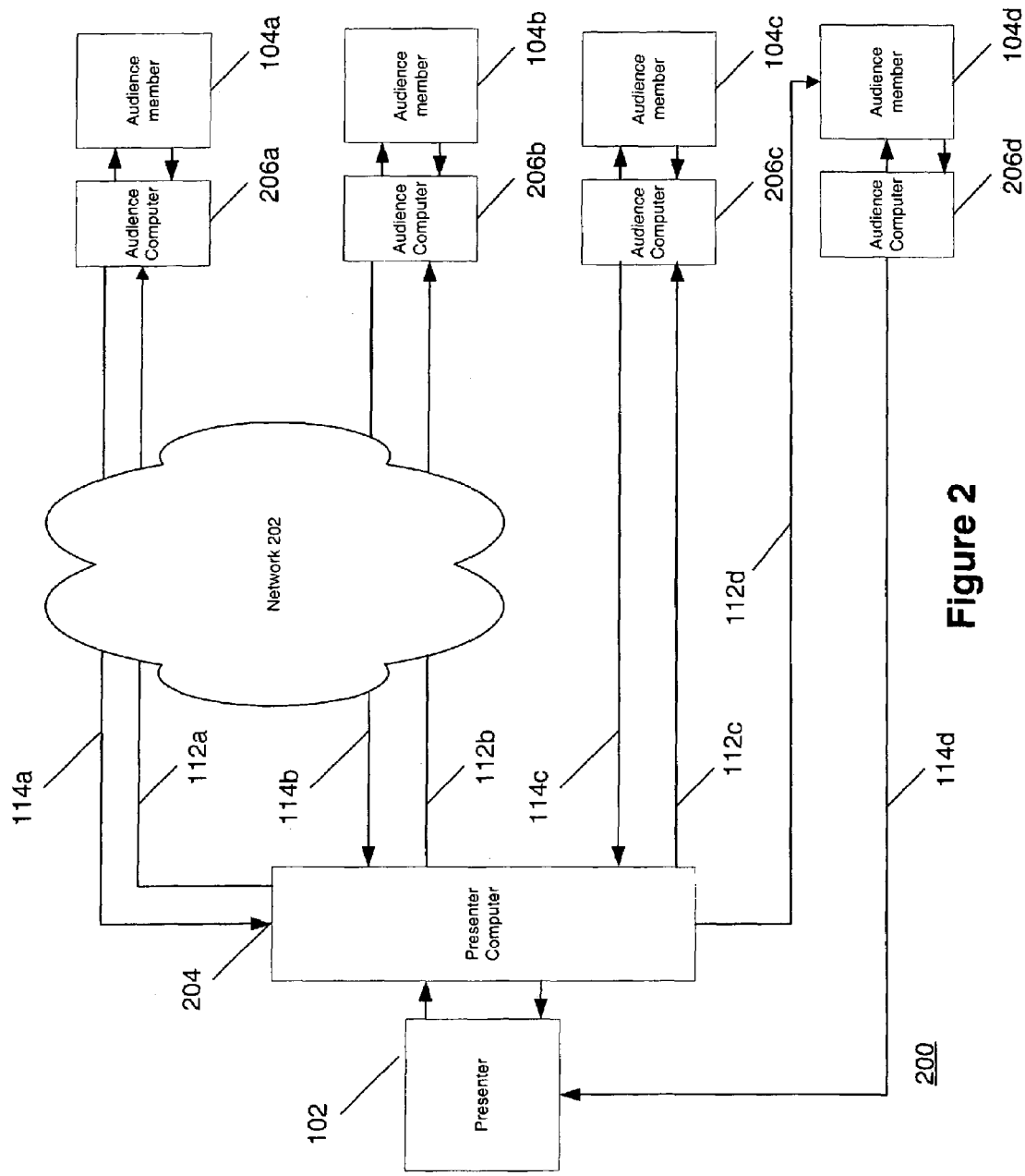
FIG. 2 is a block diagram depicting a computer implemented presentation.

FIG. 2 depicts a presentation 200 conducted using one or more computers. In presentation 200, presenter 102 utilizes presenter computer 204, and audience members 104a-d utilize audience computers 206a-d, respectively. Presentation 200 also includes communication links 112a-d from presenter 102 to audience members 104a-d, respectively. Presentation 200 may also include communication channel 114a-d from audience members 104a-d to presenter 102, to facilitate audience responses.

In one embodiment, communication links 112 and 114 may comprise communication links 112a, 112b, 114a, and 114b, by which presenter 102 may communicate with audience member 104b. In this embodiment, presenter 102 may input the presentation via a microphone, video camera or other input into computer 204 or may create a presentation on the computer such as by utilizing Microsoft's PowerPoint™ presentation software. Presenter computer 204 may then transmit the presentation to audience member 104a-b via a network 202 and audience computer 206a-b. Network 202 may comprise any one of a number of types of networks over which audience computer and presentation computers communicate including: Local Area Networks (LAN), Wide Area Networks (WAN), the Internet, and any other networks that distribute processing and share data among a plurality of nodes. Audience member 204a may similarly respond to presenter 102 by inputting responses into audience computer 206a for transmission to presenter 102 via the network and presenter computer 204.

In a second embodiment, communication links 112 and 114 may be implemented as communication links 112c and 114c. In this implementation, presenter 102 communicates to audience member 104c by inputting the presentation into presenter computer 204 for transmission across communication link to audience member 104c via audience computer 206c. Communication link 206c may be may be any dedicated communication link between presenter computer 204 and audience computer 206c, such as a phone modem connection, USB connection, wireless connection or other communication means. Audience member 104c may then respond by inputting any response into audience computer 206d for transmission to presenter 102 via presenter computer 204.

In a third embodiment, communication links 112 and 114 may be implemented as communication links 112d and 114d. In this implementation, presenter 102 communicates to audience member 104d by inputting the presentation into presenter computer 204 for transmission across communication link directly to audience member 104d. Audience member 104d may then respond by inputting any response into audience computer 206d for direct transmission to presenter 102. One of ordinary skill in the art will recognize that any of the communication methods described in FIGS. 1 and 2 may be used in any combination, without departing from the scope and spirit of the present invention.

In one embodiment, presenter computer 204 and audience computers 206a-d may implement the presentation by incorporating hardware containing the necessary instructions. In a second embodiment, presentation 200 may be implemented as software, and, in a third embodiment, a combination of hardware and software may be used to implement a presentation in accordance with the present invention.

Figure 3:
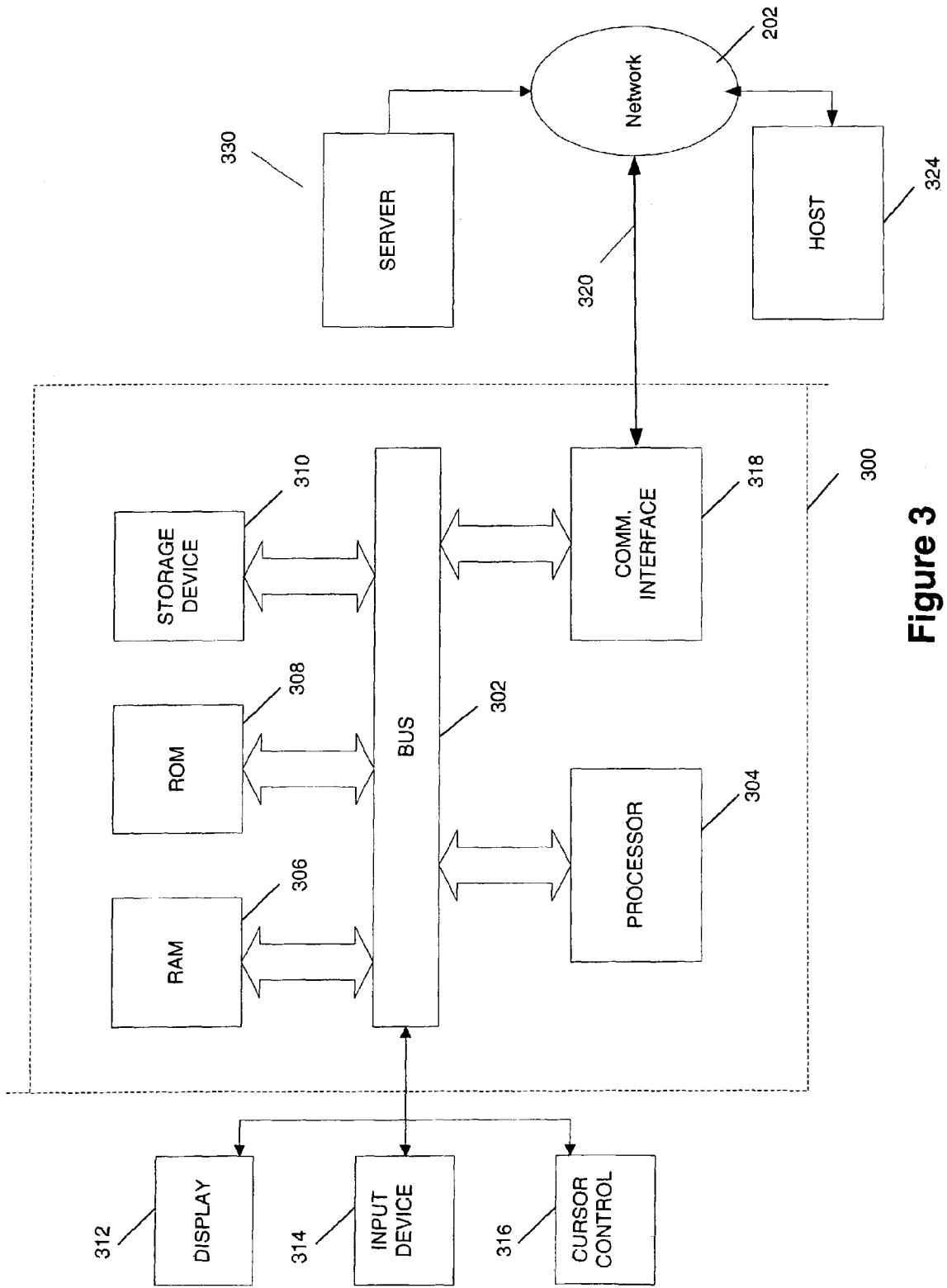
FIG. 3 is a block diagram of a representative computer system which may be used consistent with the principles of the present invention.

Any one or more of presenter computer 204 and audience computers 206a-d may be part of a conventional distributed processing system architecture. FIG. 3 is a block diagram illustrating a computer system 300 in which an embodiment of the invention in a distributed processing environment may be practiced. Computer system 300 includes bus 302 or other communication mechanism for communicating information, and processor 304 coupled to bus 302 for processing information. Computer system 300 also includes a main memory, such as random access memory (RAM) 306, coupled to bus 302 for storing information and instructions during execution by processor 304. RAM 306 also may be used for storing temporary variables or other intermediate information during execution of instructions to be executed by processor 304. Computer system 300 further includes a read only memory (ROM) 308 or other storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to display 312, such as a cathode ray tube (CRT), for displaying information to a computer user. Input device 314, including alphanumeric and other keys, is coupled to bus 302 for communicating information and command selections to processor 304. Another type of user input device is cursor control 316, such as a mouse, a trackball or cursor direction keys for communicating direction information and command selections to processor 304 and for controlling cursor movement on display 312. This input device typically has two degrees of freedom in two axes, a first axis (e.g., x) and a second axis (e.g., y), which allow the device to specify positions in a plane.

According to one embodiment, computer system 300 performs the instructions necessary to execute a presentation, and either alone or in combination with another computer system, calculates a cognitive involvement score for one or more audience members in response to processor 304 executing one or more sequences of instructions contained in RAM 306. Such instructions may be read into RAM 306 from another computer-readable medium, such as storage device 310. Execution of the sequences of instructions contained in RAM 306 causes processor 304 to perform the process steps described herein. In an alternative implementation, hard-wired circuitry may be used in place of, or in combination with software instructions to implement the invention. Thus, implementations consistent with the principles of the present invention are not limited to any specific combination of hardware circuitry and software.

The term "computer-readable medium" as used herein refers to any media that participates in providing instructions to processor 304 for execution. Such a medium may take many forms, including but not limited to, non-volatile, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media may also take the form of acoustic or light waves, such as those generated during radio-wave and infra-red data communications.

Common forms of computer-readable media include, for example, a floppy disk, flexible disk, hard disk, magnetic tape, or any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer may read. For the purposes of this discussion, carrier waves are the signals which carry the data to and from computer 300.

Various forms of computer-readable media may be involved in carrying one or more sequences of one or more instructions to processor 304 for execution. For example, the instructions may initially be carried on the magnetic disk of a remote computer. The remote computer may load the instructions into a dynamic memory and send the instructions over a telephone line using a modem. A modem local to computer system 300 may receive the data on the telephone line and use an infra-red transmitter to convert the data to an infra-red signal. An infra-red detector coupled to bus 302 may receive the data carried in the infra-red signal and place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that may be connected to network 202. Network 202 may be a local area network (LAN), wide area network (WAN), or any other network configuration. For example, communication interface 318 may be an integrated services digital network (ISDN) card or a modem to provide a data communication connection to a corresponding type of telephone line. Computer system 300 may communicate with host 324 via network 202. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. In this embodiment, network 202 may comprise an Internet Service Provider (ISP). For example, network link 320 may provide a connection to data equipment operated by the ISP. ISP 326, in turn, provides data communication services from server 330 or host 324 to computer system 300. Network 202 may use electric, electromagnetic or optical signals that carry digital data streams. Network link 320, communicating via network 202 may function as communication link 112 and/or communication link 114, consistent with the present invention.

Computer system 300 may send messages and receive data, including program code, through network 202, network link 320 and communication interface 318. In this embodiment, a server 330 may transmit an application program to computer 300 via network 202 and communication interface 318. In accordance with the present invention, one such downloaded application analyzes the cognitive involvement of audience members in a presentation. The received code may be executed by processor 304 as it is received and/or stored in storage device 310, or other non-volatile storage for later execution.

Although computer system 300 is shown in FIG. 3 as connectable to server 330, those skilled in the art will recognize that computer system 300 may establish connections to multiple servers on the Internet. Each such server includes an HTML-based Internet application, which may provide information to computer system 300 upon request in a manner consistent with the present invention.

Figure 4:
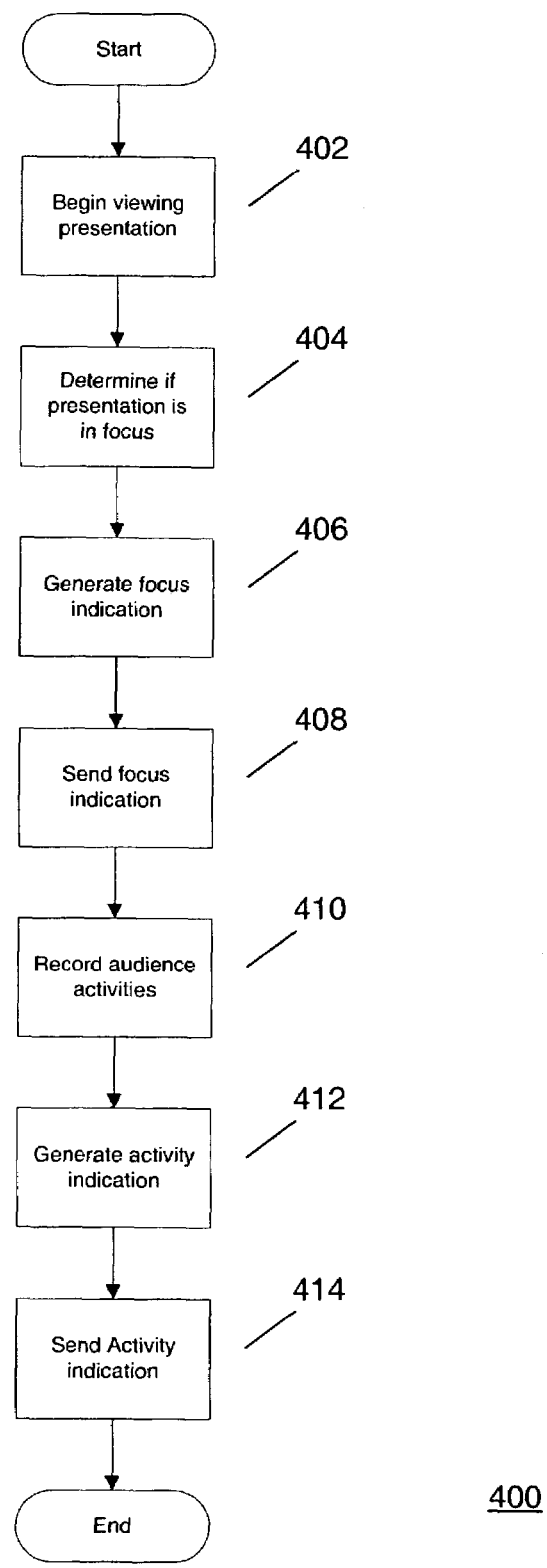
FIG. 4 is a flowchart depicting a method for gathering and reporting information for calculating a cognitive involvement score.

FIG. 4 depicts a flowchart that describes a method 400 for gathering and reporting information usable to calculate a cognitive involvement score for an audience member. In one embodiment, the steps of method 400 are performed by processor 304 of audience computer 206.

Audience computer 206 begins by initiating processing of the presentation (step 400). As the presentation continues, audience member 104 may be focusing on presentation 200 on audience computer 206, but may also be performing any number of other tasks or activities either at the same time, or in place of focusing on the presentation.

Audience computer 206 next determines whether the presentation is in focus by the audience member (step 404). Audience computer 206 may do so by determining whether processor 304 is processing the instructions necessary to conduct the presentation, or if processor 304 is processing instructions necessary to perform an unrelated task or process. In an alternative embodiment, audience computer 206 may determine whether the presentation application operating on the audience computer 206 is in focus on audience computer 206. For an audience computer 206 running a Windows-based or other similar operating system that allows multiple processes or applications to be "open" simultaneously, computer 206 may determine which "open" application is currently in the foreground of the desktop and therefore "in focus."

Figure 5:
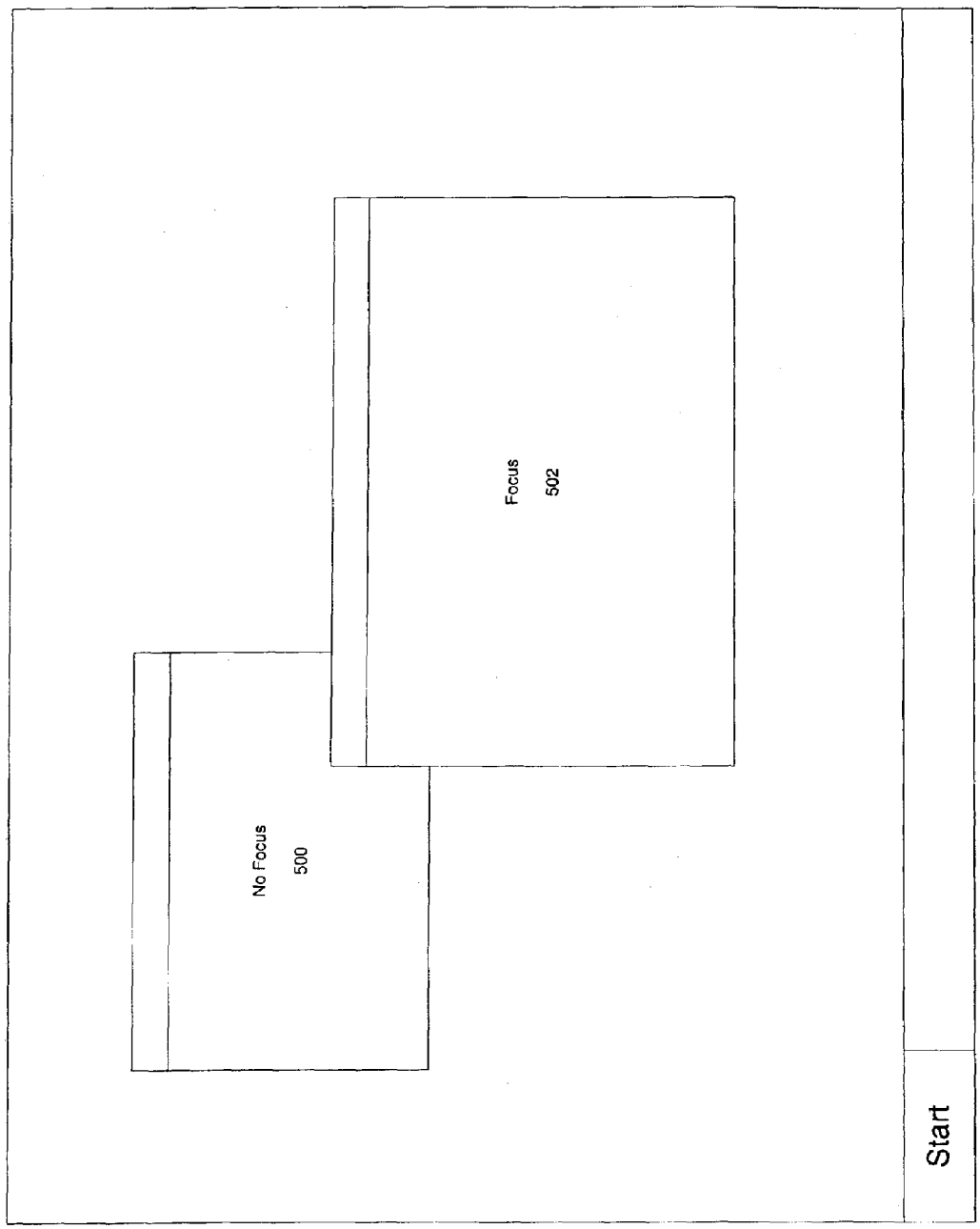
FIG. 5 is a depiction of a computer screen demonstrating an application that is "in focus" consistent with the principles of the present invention.

For example, FIG. 5 depicts a representative screen from audience computer 206, in which two applications, 500 and 502 are open. Application 500 is open, but is in the background and is not currently active, therefore, it is said to be "out of focus." Application 502 is in the foreground, and is therefore "in focus." Audience computer 206 may therefore determine whether presentation 200 is in focus by determining whether the presentation application is application 500 or 502.

Once audience computer 206 has determined whether presentation 200 is in focus (step 404), it generates a focus indication (step 406). This indication will contain sufficient information necessary to indicate to presenter computer whether the application is "in focus." In addition, the indication may contain other information, such as the area of the display of audience computer 206 covered by the presentation application (or the information necessary to calculate it). Audience computer 206 will then send the focus indication to presenter computer 204 (step 408), and may do so using communication link 114 or another communication link.

During viewing of the presentation, audience member 104 will be performing one or more tasks. The tasks or activities performed by audience member 104 may either be responsive or non-responsive. A responsive activity is one intended by the audience member to convey information to, or to communicate with the presenter. For example, asking or responding to a question, or inputting a command to a computer to cause information to be conveyed to the presenter are responsive activities. Non-responsive activities include all other activities performed by the audience member that are not intended to convey information to the presenter. Such activities may be related to the presentation, for example, taking notes, or inputting a command to a computer to cause a presentation application to become "in focus" (discussed further below). In addition, activities unrelated to the presentation, such as doodling, are non-responsive activities.

Audience computer 206 will record all tasks or activities performed on audience computer 206 (step 410). Audience computer 206 will then generate an activity indication for both responsive and non-responsive tasks (step 412). Each activity indication will identify a task that has been performed by audience member 104. For example, audience computer 206 may generate an activity indication for each movement of the mouse, for each command inputted by the user causing a question to be presented (responsive), for each time a mouse pointer passes over an application, icon, or other area of the computer screen (non-responsive), or for any other activity performed on the audience computer. Audience computer will then send the activity indications to presenter computer 204 and may do so via communications link 114 or via other equivalent communication means to presenter computer 204.

Figure 6:
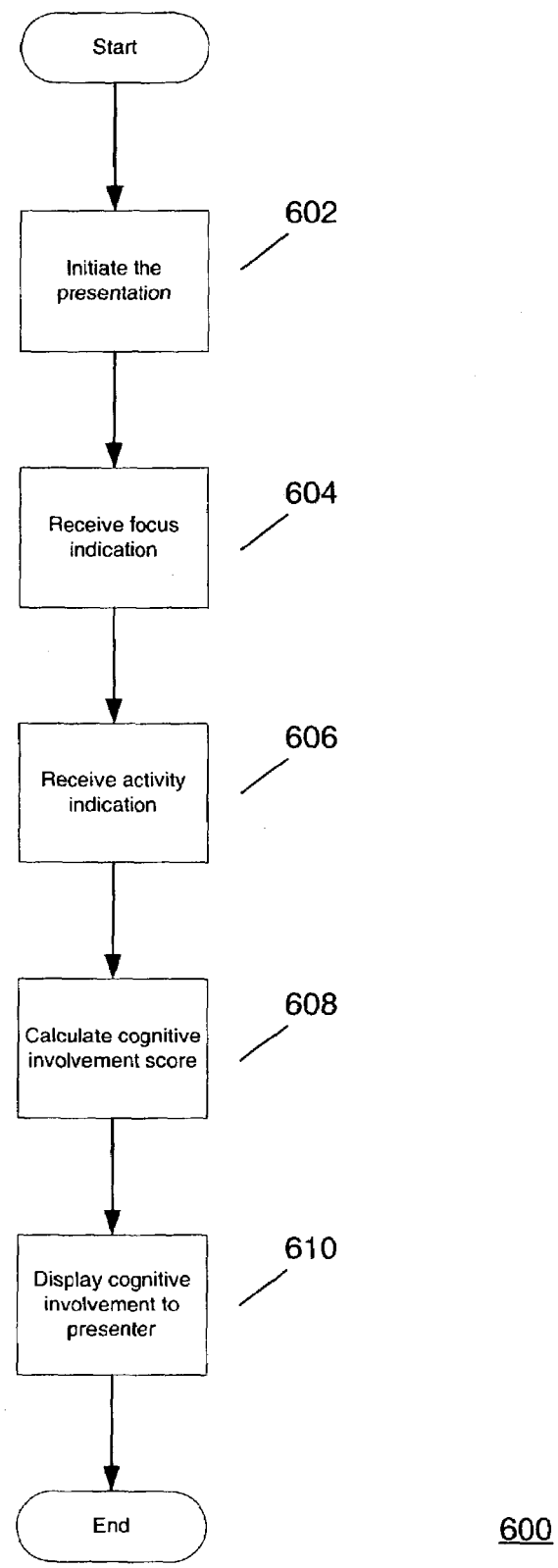
FIG. 6 is a flowchart depicting a method for determining the cognitive involvement of an audience member.

FIG. 6 depicts a flowchart that describes a method 600 for analyzing the cognitive involvement of audience members in a presentation. In one embodiment of the computer implemented presentation 200, the method for analyzing the cognitive involvement of audience members is loaded into and performed by processor 304 of presenter computer 204.

Processor 304 begins when a presenter initiates the presentation (step 602). As the presenter conducts the presentation, audience member 104 is able to perceive the presentation as described in FIG. 4. As the presentation continues, audience member 104 may be focusing on presentation 200 on audience computer 206, but may also be performing any number of other tasks or activities either at the same time, or in place of focusing on the presentation.

Presenter computer 204 may receive a focus indication, i.e., an indication of whether or not the presentation is in focus by audience computer 206 (step 604). In focus means that the audience member is paying attention to the presentation. In one exemplary embodiment, audience computer 206 may determine whether the presentation is in focus (step 404, FIG. 4). Presenter computer 204 may also receive an activity indication for each activity performed by audience member 104 (step 606). The activity indication will identify that the task or activity has been performed by audience member 104.

Processor 304 of presenter computer 204 will calculate a cognitive involvement score for audience member 104 (step 608) from one or more of the focus and/or activity indications received. The cognitive involvement score for audience member 104 may be calculated once for an entire presentation, or may be calculated for a series of time samples, such that the audience member's cognitive involvement in the presentation may be traced over time.

Figure 7:
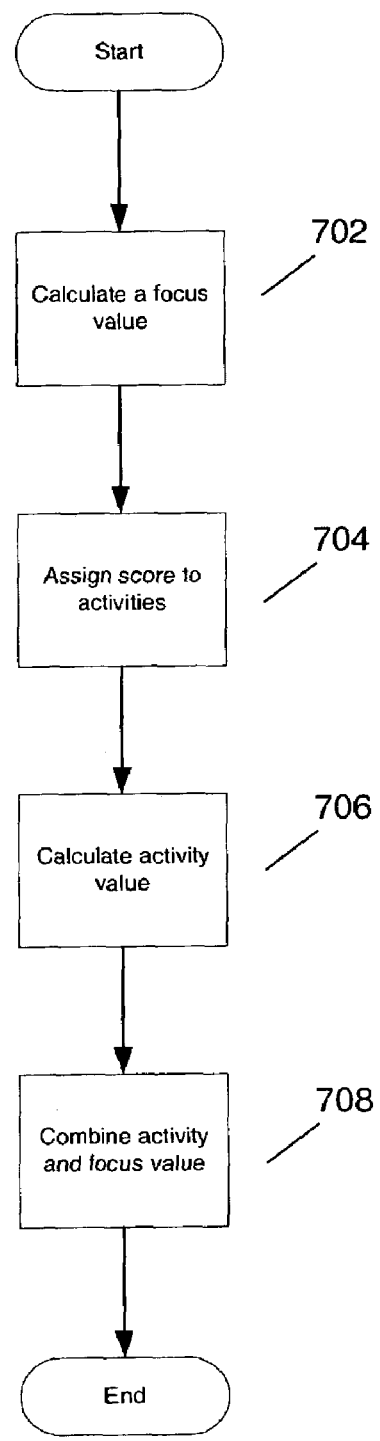
FIG. 7 is a flowchart depicting a method for calculating a cognitive involvement score for an audience member.

Referring now to FIG. 7, there is shown a more detailed flowchart describing method 700 for calculating a cognitive involvement score (step 608). The process begins when processor 304 calculates a focus value (step 702) from the information received in the focus indication. A focus value represents the level of cognitive involvement of audience member 104 in the presentation.

In one embodiment, the focus value may consist of a Boolean value (a "1" or "0") representing whether the presentation (or presentation application) is in focus. For example, a value of "1" may indicate that the presentation is in focus, whereas a "0" would indicate that the presentation is not in focus. In a second embodiment, processor 304 may calculate the focus value by computing a percentage value representing the percentage of the audience member's attention that is focused on the presentation. For example, processor 304 may calculate the percentage of the area of the audience member's desktop that is covered by the presentation application (whether or not the application is in the foreground). Processor 304 may also calculate the percentage of time that audience member spent performing a task associated with the presentation.

In a third embodiment, processor 304 may calculate the focus value as a decimal value. More specifically, processor 304 may multiply a Boolean value (F) by the percentage of the area of the audience member's desktop that is covered by the presentation application. The method will utilize the formula:

$$\frac{F \times (\text{Area of the Presentation})}{(\text{Area of the Screen})}$$

Therefore, if the application is out of focus, the Boolean value (F) will be "0," and the result will be zero, denoting that the audience member is not focused on the presentation. If, however, the presentation application is in focus, the Boolean value (F) will be "1" and the result of the formula will be the percentage of the area of the computer screen that is covered by the presentation application.

After calculating a focus value, processing flows to step 704, where a score is assigned to each activity indicated by the received activity indications. Each activity indication identifies a task or activity performed by audience member 104 or audience computer 206 during the presentation. The scores for each activity may be preassigned, or assigned dynamically.

Figure 8:
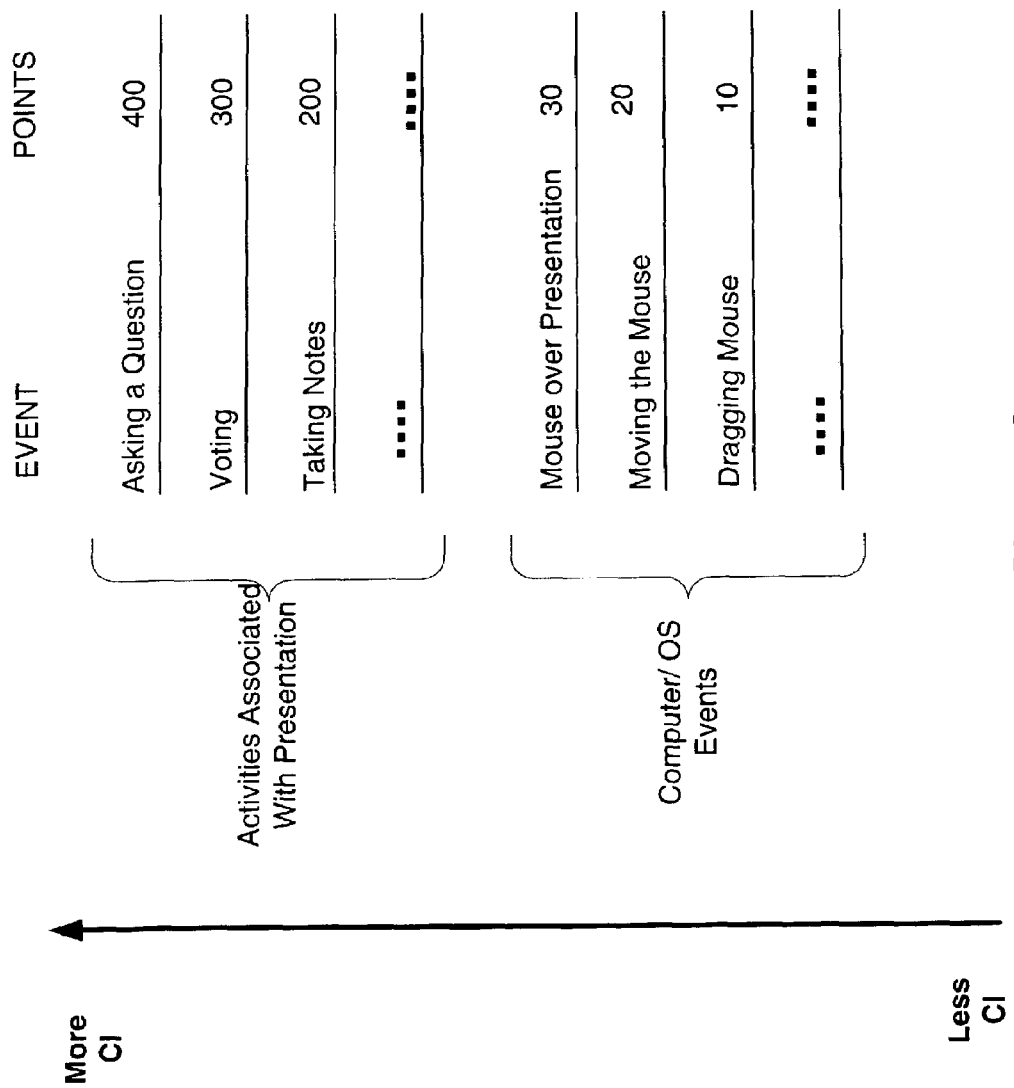
FIG. 8 is an example of a scoring system usable for scoring audience member's activities consistent with the principles of the present invention.

An example of one possible set of assigned values is depicted in FIG. 8. FIG. 8 depicts a non-exhaustive list of activities that may be performed on audience computer 206. In this example, a higher score represents a higher level of cognitive involvement. As shown, the act of asking a question of the presenter would necessarily involve more cognitive involvement than "moving the mouse" on the computer desktop. Therefore, "asking a question" receives more points (400) than "moving the mouse" (20). In general, performance of any activities associated with the presentation would require more cognitive involvement than would performance of computer or operating system events. Therefore, the points awarded for an activity associated with the presentation would be higher than those for the computer or operating system events.

Once the points have been awarded for the activities performed, the points are used to create an activity value for the audience member (step 706). In one embodiment, the points for all activities for the audience member may be added together to compute the activity score.

Finally, processor 304 will calculate a cognitive involvement score from the activity value and the focus value (step 708). In one embodiment, the cognitive involvement score will be calculated by adding the focus value (in decimal form) to the activity value. In this embodiment, the cognitive involvement score will comprise a number, having a decimal portion and a whole number portion. The whole number portion of the cognitive involvement score will represent the activity value, and its magnitude will indicate the overall level of activity associated with the presentation. For example, if activity values are assigned such that a higher score is awarded for an activity associated with the presentation, then a higher activity score will correspondingly demonstrate a higher level of cognitive involvement. In addition, the decimal portion of the cognitive involvement score will indicate the focus value, representing the degree of focus by the audience member on the presentation.

In this embodiment, a number such as 7400.23 will indicate a high level of activity (assuming activity values are assigned such that a higher score is awarded for an activity associated with the presentation), for a low degree of focus. An audience member awarded such a score would have been focused on the presentation for a relatively small amount of time, but with great participation during that time. In contrast, an audience member awarded a 400.90 would indicate an audience member who is focused on the presentation, but who is relatively inactive. This would be the case if the application was maintained in the foreground, but without much activity.

In another embodiment, the cognitive involvement score may be computed by multiplying the decimal focus value by the activity value to create a relative score for the audience member. In this embodiment, the 7400.23 would be represented as 1702 (the product of 7400×0.23), the activity score being significantly reduced to indicate the low degree of focus. The 400.90 would be represented as 360 (400×0.9), a relatively high cognitive involvement score for a low degree of activity.

In one embodiment, the cognitive involvement score will be a focus value representing the degree of focus on the presentation. In another embodiment, the cognitive involvement score will be an activity value representing a degree to which one or more activities performed by an audience member demonstrate cognitive involvement in the presentation.

Referring to FIG. 6, it is shown that once the cognitive involvement score for an audience member has been calculated, the cognitive involvement score for that audience member may be displayed to presenter 102 (step 410). Such a display may take any form, and may be displayed on presenter computer 204 or simply communicated to presenter 102 via any other known or later developed method.

Figure 9:
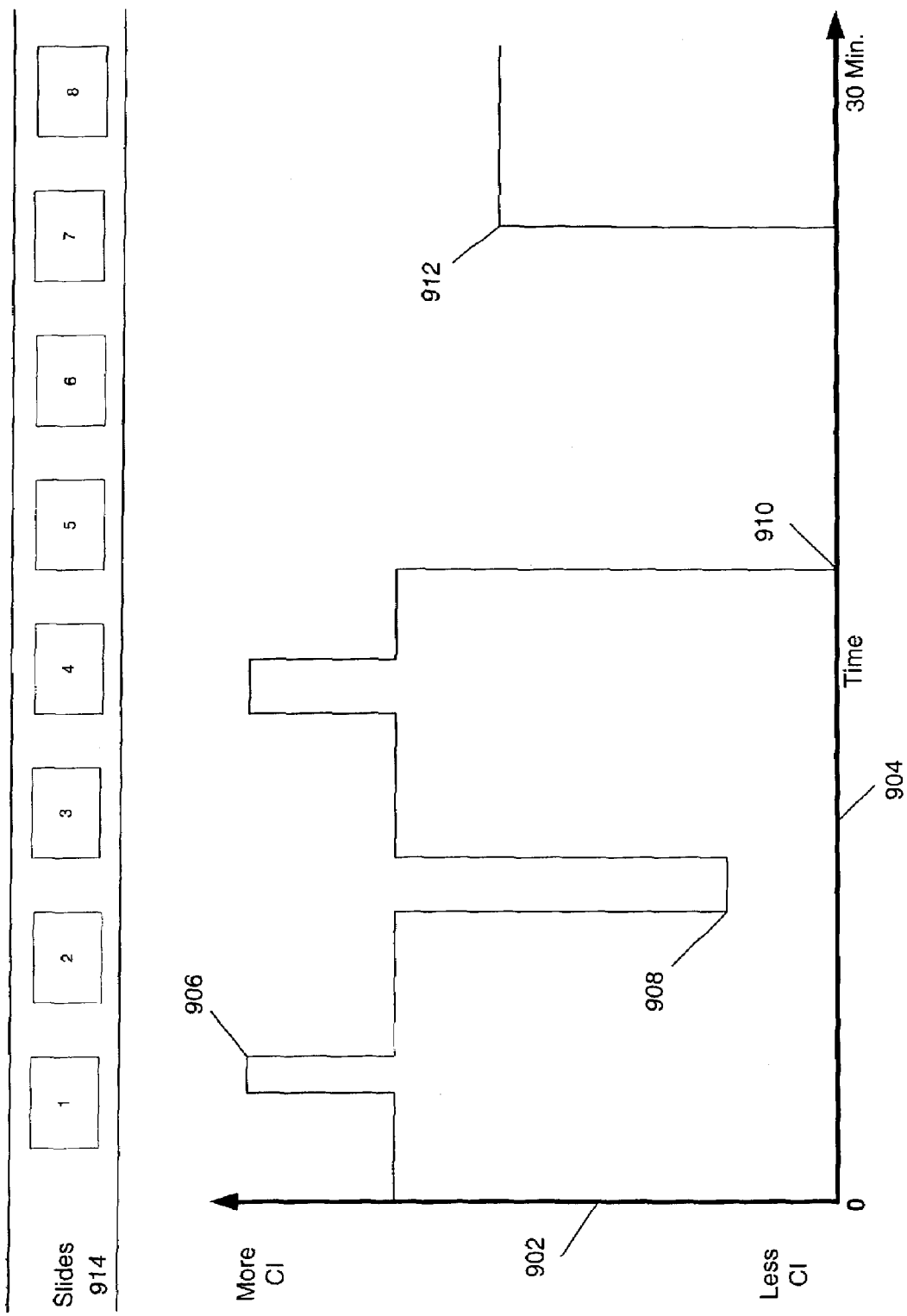
FIG. 9 is a graph depicting an exemplary display of a cognitive involvement score for a single audience member.

In one exemplary embodiment, the cognitive involvement score for a user may take the form of a graph such as shown in FIG. 9. FIG. 9 depicts a two-dimensional graph on which Y axis 902 charts the cognitive involvement (CI) score, and X axis 904 charts the time for which the score was calculated. In addition, the slides 914 indicate the progression of presentation 200 along the timeline.

In this example, as the value of Y increases, the level of cognitive involvement of the audience member is greater. At point 906, during slide 1, the user may have asked a question of the presenter, or responded to a question posed by the presenter. Point 908, corresponding to slide 2, may represent a score for an audience member whose cognitive involvement was much lower. For example, the audience member may be checking email on their computer during that slide. Similarly, at point 910, corresponding to slide 5, the cognitive involvement score has decreased to 0, which may represent that the audience member has logged off audience computer 206, thus ending participation in the presentation. Finally, at point 912, during slide 7, the audience member has a mid-level of cognitive involvement, which may be representative of a user that is logged on, and the presentation application is in focus, but there is little activity for the user.

Figure 10:
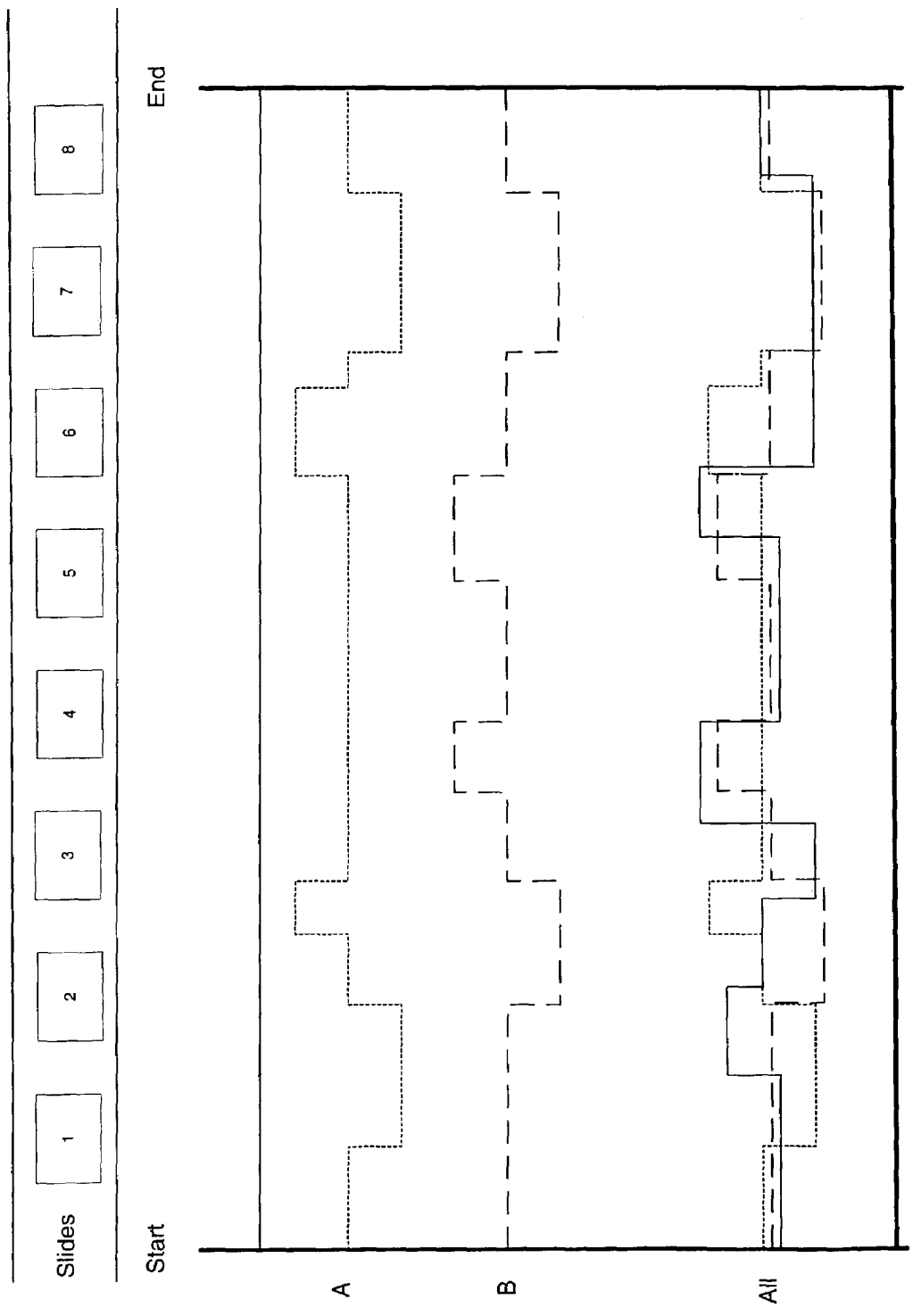
FIG. 10 is graph depicting an exemplary display of a cognitive involvement score for each of a plurality of audience members.

The cognitive involvement score generated may also be plotted for each audience member. In this case, the cognitive involvement scores for each audience member may be plotted together on a single graph such as that shown in FIG. 10.

For brevity, the above discussion describes the present invention in the context of a computerized presentation 200, wherein method 600 is executing on presenter computer 204, and method 400 is executing on audience computer 206. Each step of the processes performed by the present invention may be, but need not be performed by the same computer. In one exemplary configuration, one or more steps of method 600 may be performed at audience computer 206. For example, audience computer 206 may perform steps 402-408, and may even generate a graphical representation for display at the presenter computer 204. Similarly, one or more steps of method 400 may be performed by presenter computer 204.

Finally, one of ordinary skill in the art will also recognize that method 400 may be implemented in manually implemented presentation 100, in which the steps of methods 400 and 600 may be performed by audience member 104, presenter 102, another individual associated with the presentation, or on a dedicated device such as a remote or handheld device capable of performing the described steps.

In manually-implemented presentation 100, whether the presentation is "in focus" may be determined in a number of ways. For example, presenter 102 or another individual associated with presenter 102 may watch audience member 104 to determine if the audience member is focused on the presentation. Such tasks or actions that may be indicative of involvement in the presentation include responding to a question, maintaining eye contact with the presenter, or looking back to earlier notes from the presentation. The actions or tasks may, however indicate that audience member 104 is not focused on the presentation (i.e., the audience member is doodling, or has stood up to leave the room).

In a manually-implemented presentation, presenter 102, or other individual performing the steps of method 400, will receive an indication of every task performed by audience member 104. In this embodiment, such tasks may reflect physical activities, rather than computer processes or inputs. For example, activity indications could be generated for all activities, such as (1) taking notes, (2) eating a snack, (3) doodling in a notebook, and (4) leaving the room. The activities listed are not intended to be exhaustive lists, and one of ordinary skill in the art will recognize that, consistent with the principles of the present invention, any task performed by audience member 104 or audience computer 206 may be indicated. In a manually-implemented presentation, an activity indication may be generated and sent by another human, by a handheld device or by other means, for every activity performed by audience member 104.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for analyzing the cognitive involvement of one or more audience members, the method comprising:
   receiving a focus value representing a degree of focus of an audience member on a presentation, the focus value calculated by multiplying a Boolean focus value by a percentage of an audience computer screen covered by a presentation task;
   receiving a task value representing a degree of cognitive involvement of the audience member in the presentation;
   calculating a cognitive involvement score from the focus value and the task value; and
   providing the calculated cognitive involvement score so that some action can be taken based on the cognitive involvement of the audience members.

2. The method of claim 1, further comprising calculating the task value.

3. The method of claim 2, wherein calculating the task value comprises
   assigning a relative score to one or more tasks performed by the audience member; and
   calculating the task value from the at least one relative score.

4. The method of claim 2, wherein calculating the task value from at least one relative score comprises summing at least one relative score to produce the task value.

5. The method of claim 2, wherein calculating a task value comprises assigning a relative value to each input to an audience computer, the relative value representing a degree to which the input demonstrates cognitive involvement in the presentation.

6. The method of claim 1, wherein the cognitive involvement score comprises
   a decimal portion representing the degree of focus of the audience member on the presentation; and
   a whole number portion representing the degree of cognitive involvement of the audience member.

7. The method of claim 1, wherein the cognitive involvement score comprises
   a decimal portion representing the level of focus on a presentation application, and
   a whole number portion representing a degree to which a plurality of inputs to an audience computer demonstrate cognitive involvement in the presentation.

8. The method of claim 1, wherein receiving a task value comprises:
   receiving at least one activity performed by the audience member; and
   calculating the task value from the at least one activity.

9. The method of claim 8, wherein receiving a task value further comprises:
   assigning a relative value to each activity performed by the audience member, said value representative of a degree of cognitive involvement demonstrated by the activity; and
   calculating the task value from the one or more relative values.

10. The method of claim 1, wherein receiving a task value comprises:
    receiving at least one activity indication based on one or more inputs into an audience computer; and
    calculating the task value from the at least one activity indication.

11. The method of claim 1, wherein receiving a focus value comprises:
    receiving a focus indication of whether a presentation is in focus.

12. The method of claim 1, wherein the Boolean focus value is indicative of whether a presentation is in focus.

13. A computer-readable medium containing instruction for controlling a computer system to analyze the cognitive involvement of one or more audience members, by a method comprising:
    receiving a focus value representing a degree of focus of an audience member on a presentation, the focus value calculated by multiplying a Boolean focus value by a percentage of an audience computer screen covered by a presentation task;
    receiving a task value representing a degree of cognitive involvement of the audience member in the presentation;
    calculating a cognitive involvement score from the focus value and the task value; and
    providing the calculated cognitive involvement score to a person who can take some action based on the cognitive involvement of the audience members.

14. The computer-readable medium of claim 13, wherein the task value is calculated by
    assigning a relative score to one or more tasks performed by the audience member; and
    calculating the task value from the at least one relative score.

15. The computer-readable medium of claim 14, wherein calculating the task value from at least one relative score comprises summing at least one relative score to produce the task value.

16. The computer-readable medium of claim 13, wherein the cognitive involvement score comprises
    a decimal portion representing the degree of focus of the audience member on the presentation; and
    a whole number portion representing the degree of cognitive involvement of the audience member.

17. The computer-readable medium of claim 13, wherein the focus value represents a relative area of an audience computer screen covered by a presentation task.

18. The computer-readable medium of claim 13, wherein a task value is calculated based on assigning a relative value to each input to an audience computer, the relative value representing a degree to which the input demonstrates cognitive involvement in the presentation.

19. The computer-readable medium of claim 13, wherein the cognitive involvement score comprises
   a decimal portion representing the level of focus on a presentation application, and
   a whole number portion representing a degree to which a plurality of inputs to an audience computer demonstrate cognitive involvement in the presentation.

20. The computer-readable medium of claim 13, wherein receiving a task value comprises:
   receiving at least one activity performed by the audience member; and
   calculating the task value from the at least one activity.

21. The computer-readable medium of claim 13, wherein receiving a task value comprises:
   receiving at least one activity indication based on one or more inputs into an audience computer; and
   calculating the task value from the at least one activity indication.

22. The computer-readable medium of claim 21, wherein receiving a task value further comprises:
   assigning a relative value to each activity performed by the audience member, said value representative of a degree of cognitive involvement demonstrated by the activity; and
   calculating the task value from the one or more relative values.

23. The computer-readable medium of claim 13, wherein receiving a focus value comprises:
   receiving a focus indication of whether a presentation is in focus.

24. The computer-readable medium of claim 13, wherein the Boolean focus value is indicative of whether a presentation is in focus.

* * * * *